United States Patent [19]

Woffinden et al.

[11] Patent Number: 4,651,321

[45] Date of Patent: Mar. 17, 1987

[54] APPARATUS FOR REDUCING STORAGE NECESSARY FOR ERROR CORRECTION AND DETECTION IN DATA PROCESSING MACHINES

[75] Inventors: Gary A. Woffinden, Scotts Valley; Joseph A. Petolino, Jr., Mountain View, both of Calif.

[73] Assignee: Amdahl Corporation, Sunnyvale, Calif.

[21] Appl. No.: 527,677

[22] Filed: Aug. 30, 1983

[51] Int. Cl.⁴ .............................................. G06F 11/10
[52] U.S. Cl. ........................................... 371/38; 371/49
[58] Field of Search ..................... 371/38, 37, 49, 50, 371/51

[56] References Cited

U.S. PATENT DOCUMENTS

| | | | |
|---|---|---|---|
| 4,506,365 | 3/1985 | Collins | 371/38 |
| 4,509,172 | 4/1985 | Chen | 371/38 |
| 4,513,420 | 4/1985 | Collins | 371/38 |
| 4,523,314 | 6/1985 | Burns | 371/38 |
| 4,532,629 | 7/1985 | Furuya | 371/38 |
| 4,547,882 | 10/1985 | Tanner | 371/38 |

Primary Examiner—Michael R. Fleming
Attorney, Agent, or Firm—Fliesler, Dubb, Meyer & Lovejoy

[57] ABSTRACT

Present invention presents a novel mechanism for reducing the amount of storage space necessary to perform error checking and correcting in a storage unit of a data processing machine by utilizing the information present in the parity checking portion of the storage unit.

The novel mechanism is based on generating an error checking and correcting code which includes a first portion identifiable by parity bits normally stored with data words in a data storage device and a second portion. The second portion contains fewer bits than required in the prior art for an equivalent level of error checking and correcting and only the second portion is stored. When data is moved out of the storage device, the first portion is identified from the parity bits.

13 Claims, 2 Drawing Figures

APPARATUS FOR REDUCING STORAGE NECESSARY FOR ERROR CORRECTION AND DETECTION IN DATA PROCESSING MACHINES

FIELD OF THE INVENTION

This invention relates to data processing machines. Particularly the field of this invention is the detection and correction of errors that may exist in data as it is transferred through the data processing machine.

BACKGROUND OF THE INVENTION

As data is transferred through a data processing machine, errors occur due to failures of memory devices or electrical contacts or other reasons. Thus, data processing machines have mechanisms for detecting errors that occur as the data is moved from one point to another within the machine.

A common method for detecting errors which is often implemented is accomplished by calculating the parity of each byte of data as it is moved between portions of the data processing machine. This method is simple to implement and can be used throughout the data processing machine. It does add one bit to the length of storage required for each byte over which parity is generated. The error checking is done by first calculating the parity of the data byte in question, then transferring the data to the portion of the data processing machine desired, and last, regenerating the parity at the location to which the data is transferred and comparing that regenerated parity with the earlier parity. If the parity bits do not coincide, then an error has occurred within the byte. The parity is generated by simply taking the exclusive-OR of the bits within the byte.

Although parity checking is a simple and economical means for detecting errors that may occur within a byte, it is limited in that it can only detect errors if they occur to odd numbers of bits with the byte, and it does not indicate to which bit within the byte the error occurred. Thus, even though a parity check will indicate that the data contains an error it will not enable the data processing machine to correct that error.

The reliability of a data processing machine can be enhanced to a large degree by including a mechanism for correcting errors that are detected. Thus typically, data processing machines include logic between major portions of the machines, such as between the various memory arrays, by which errors can be detected and corrected.

Data processing machines typically move data from one storage facility to another or from one storage facility to the execution unit in words of a number of bytes of data. An acceptable design parameter for implementing error checking and correcting mechanisms is to correct all single bit errors that occur in those words of data and further to detect any double bit errors that occur. For a data word of 64 bits long which is divided into eight bytes of eight bits each, the minimum storage required to resolve the error detecting and correcting with a Hamming code function which will accomplish the single bit correction and double bit detection parameter is eight bits for each data word.

The error detecting and correcting mechanism is a rather complicated mechanism as compared to the parity mechanism, so it is not implemented every time the data transfers from one portion of the machine to another. On the other hand, the parity checking is simple enough to be implemented throughout a machine and is commonly so implemented. The amount of storage needed for error detection and correction is determined by the size of the block of data over which the detection and correction is to be accomplished and the capabilities of the error detection and correction desired. Further, error detecting and correcting is normally implemented over larger blocks of data than simple parity checking. Therefore, parity is used for checking over blocks of data of a size which is transferred from unit to unit in the data processing machine more often than over the larger error detection and correction block.

Thus each byte of data that is being transferred through the data processing machine commonly includes a parity bit. Thus, as the data is transferred into a storage facility, an additional bit of storage is included for the parity bit. In our example of a 64 bit word with eight eight-bit bytes, the storage required per byte would be nine bits in order to preserve the parity bit. With the addition of an eight-bit Hamming code that would be necessary to resolve single bit error correction and double bit error detection, the total storage required for the 64 bit word will be 64 bits of data plus eight parity bits plus eight bits for the Hamming code.

Storage in data processing machines is expensive, especially when a specialized storage facility such as those that are designed for fast access of data is involved.

Thus there is a need for an apparatus for reducing the storage necessary for error correction and detection in a data processing machine.

SUMMARY OF THE INVENTION

The present invention provides an apparatus for storing data in a data processing machine which comprises a storage unit into which data words including a parity bit are stored. An error checking and correcting means is associated with the storage unit which detects and corrects errors when the data words are moved out of the storage unit to be transferred to another portion of the data processing machine. The error checking and correcting is accomplished by including with the storage unit a move-in error checking and correcting code (ECC code) generator which generates an ECC code for storage along with the data words when the data words are moved into the storage unit. Further when the data words are moved out of the storage unit, an ECC code checking unit regenerates the ECC code and compares the regenerated ECC code with the ECC code stored when the data word was moved into the storage unit. The error checking and correcting means further includes a logical reduction unit which reduces the size of storage needed for the ECC code in order to accomplish the error detecting and correcting function by utilizing the information provided in the parity bits which are stored along with the data words.

Thus the reliability of the data processing machine is enhanced by the error checking and correcting means associated with the storage unit while the size of the storage space necessary in order to accomplish the error checking and correcting function is reduced according to the present invention. For a data word of 64 bits which includes eight bytes of eight bits each with a parity bit associated with each byte, the present invention provides that the ECC code necessary for single error correction and double error detection requires only five additional bits of storage.

DETAILED DESCRIPTION

With reference to the drawings, a detailed description of the preferred embodiment of the present invention is provided.

Figure 1:
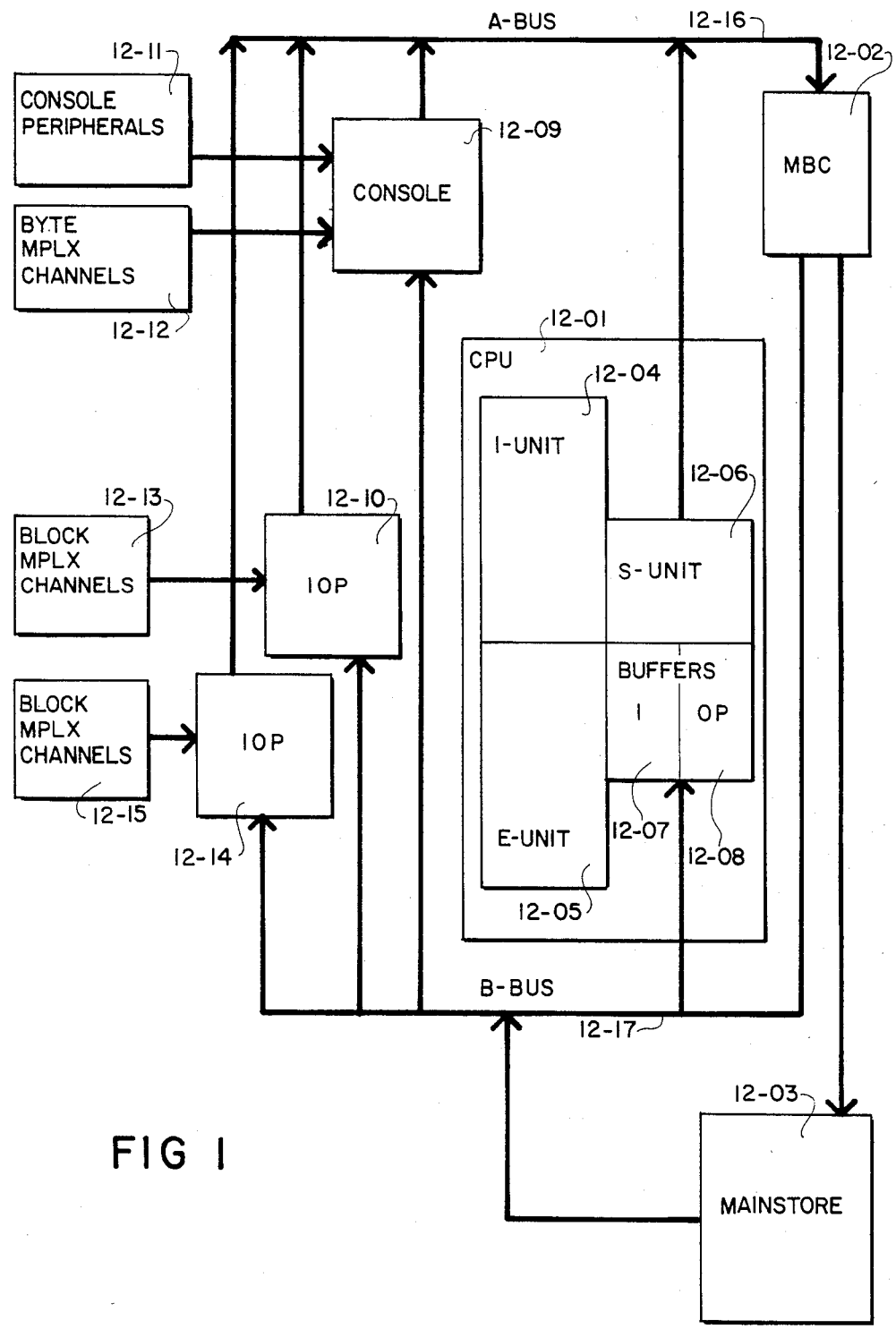
FIG. 1 is a system overview showing the data path of a data processing machine and includes the present invention.

FIG. 1 shows a block diagram of a system overview of the data processing machine D which employs the present invention. The present invention is most closely associated with the central processing unit 12-01. The central processing unit 12-01 includes five subparts as follows: the instruction unit 12-04 (I-UNIT) which fetches, decodes, and controls instructions and controls the central processing unit; the execution unit (E-UNIT) which provides computational facilities for the data processing machine; the storage unit (S-UNIT) which controls the data processing machines instruction and operand storage and retrieval facilities; the instruction buffer 12-07 which provides high-speed buffer storage for instruction streams; and the operand buffer 12-08 provides high-speed buffer storage for operand data.

Other major parts of a data processing machine as shown in FIG. 1 include the input-output processor (IOP) 12-10 which receives and processes input-output requests from the central processing unit 12-01 and provides block multiplexer channels; the console 12-09 which communicates with the central processing unit 12-01 to provide system control and byte multiplexer channels; the memory bus controller (MBC) 12-02 which provides main memory and bus control, system-wide coordination of functions and timing facilities; and the main storage unit 12-03 which provides system large-capacity memory. A second input-output processor 12-14 and additional multiplexer channels 12-15 may be included as shown in FIG. 1.

The data processing machine shown in FIG. 1 employes a dual bus structure: the A bus 12-16 and the B bus 12-17. The A bus 12-16 carries data from the console 12-09, the input-output processor 12-10, and the central processing unit 12-01 to the memory bus controller 12-02. The B bus 12-17 carries data from the memory bus controller 12-02 and the main storage unit 12-03 to the console 12-09, the input-output processor 12-10 and the central processing unit 12-01.

For a more detailed description of the system overview shown in FIG. 1 refer to the master application entitled VIRTUALLY ADDRESSED CACHE invented by Gene Myron Amdahl, Donald Laverne Hanson and Gary Arthur Woffinden, filed contemporaneously herewith and owned by a common assignee.

The present invention is concerned primarily with the flow of data to and from the high-speed operand buffer 12-08. The central features of the present invention are located in the S-unit 12-06, although some parts are found in the MBC 12-02. The arrangement of parts may be altered as suits the user.

Figure 2:
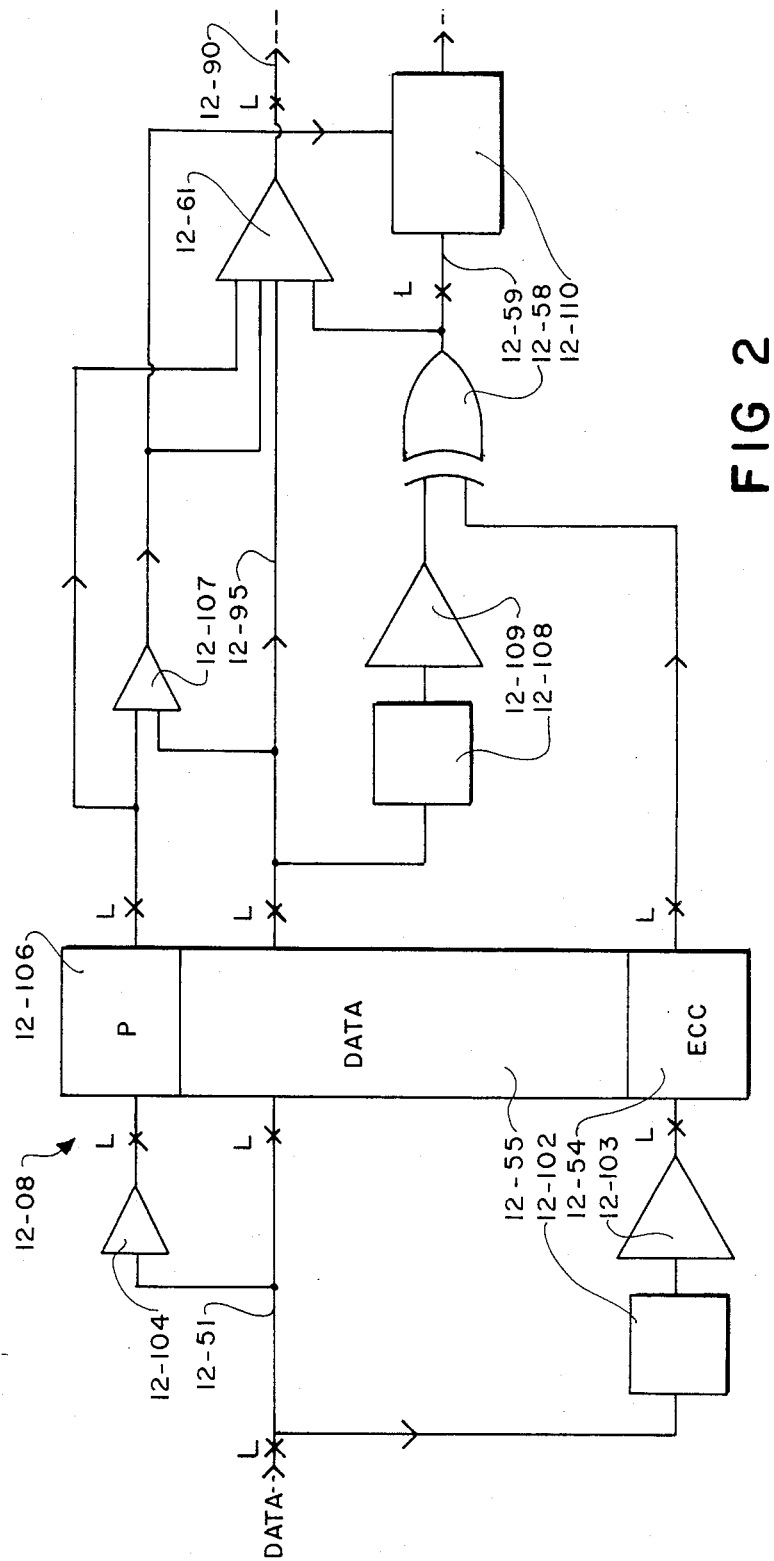
FIG. 2 is an expanded schematic diagram of a data path of a preferred embodiment of the present invention.

A detailed description of the preferred embodiment is now provided with reference to FIG. 2. As mentioned above, we are concerned with the situation that occurs when data is moved in to the high-speed buffer 12-08 of the data processing machine D shown in FIG. 1 and then moved out. The error detecting and correcting mechanism of the present invention is utilized in the preferred embodiment in association with the high speed operand buffer 12-08 because of the high cost of the storage area in the high speed operand buffer 12-08. The present invention may be used, however, in conjunction with any storage facility as suits the user.

With reference to FIG. 2, the data enters the high-speed buffer 12-08 across the data line 12-51. As the data enters, it is presented to a move-in columnwise parity generator 12-102 which calculates columnwise parity (even) for identifying errors associated with the data. Columnwise parity is generated according to the following description. The block of data over which the error checking and correcting is to be accomplished is divided into a number of bytes, each byte having a parity bit (odd) associated with it. A matrix is defined by a plurality of rows with each row including a byte. For a 64 bit block divided into eight bytes, the matrix is eight bits by eight bytes. A columnwise parity bit is the parity bit generated by calculating parity for a given column in the matrix. Thus there is a first columnwise parity bit for parity calculated over the first bit in each byte, a second columnwise parity bit calculated over the second bit in each byte, and so on.

The results of the columnwise parity generator 12-102 pass through a logical translator 12-103 where an ECC code (or error checking and correcting code) is generated and stored in the ECC code portion 12-54 of the high-speed data buffer 12-08. Also, a parity generator 12-04 calculates a parity bit for each byte of the data word before it moves into the data portion 12-55 of the high speed buffer 12-08. The parity bits are stored in the parity portion of 12-106 of the high speed buffer 12-08. Thus, stored in the high speed data buffer 12-08 are the parity bits, the data bits and the ECC code bits for each block of data that is written into the high speed data buffer 12-08. Upon move-out from the buffer 12-08 of a block of data, the data is presented to the data line 12-95. At the same time, a move-out columnwise parity generator 12-108 calculates the columnwise parity bits for the data which are passed through a move-out logical translator 12-109 to produce the ECC code associated with the data upon move-out. The ECC code that was generated upon move-in and stored in the ECC code portion 12-54 of the high speed buffer 12-08 is then exclusive-ORed with the ECC code produced at the output of the move-out logical translator 12-109 in the exclusive-OR gate 12-58. From the output of the exclusive-OR gate 12-58, a syndrome 12-59 is produced which is presented to the correct data logic unit 12-61.

At the same time the data is moving out of the high speed buffer 12-08 and having its ECC code compared with the earlier ECC code, a parity check is performed on each byte of the data block in the parity checking unit 12-107. The results of the parity checking unit 12-107 and the parity bits are then presented to the correct data logic unit 12-61 along with the syndrome 12-59 produced by the exclusive-OR gate 12-58. With the information provided by the syndrome 12-75, the parity bits and the results of the parity check, the data is corrected if possible in the correct data logic unit 12-61 and presented back to the data line 12-90.

As the syndrome 12-59 is presented to the correct data unit 12-61, it is also presented to the error analysis unit 12-110. Likewise, the results of the parity check 12-107 are presented to the error analysis unit 12-110.

With the information provided, an error condition is created by the error analysis unit if an uncorrectable error is indicated by the syndrome 12-59 and the results of the parity checks 12-107. For more detail concerning the function of the error analysis unit 12-110, refer to the related application entitled APPARATUS FOR STORING DATA WITH DEFERRED UNCORRECTABLE ERROR REPORTING invented by Gary Arthur Woffinden and Joseph Anthony Petolino, Jr., filed contemporaneously herewith and owned by a common assignee.

In the preferred embodiment, data is moved into and out of the buffer 12-08 in blocks of 64 bits which are divided into eight bytes of eight bits each. The ECC code generated by the present invention is a five bit ECC code for a 64 bit block.

TABLE 1

|    | Columnwise Parity Bits |   |   |   |   |   |   |   | ECC Code |    |    |    |    |
|----|---|---|---|---|---|---|---|---|----|----|----|----|----|
|    | 0 | 1 | 2 | 3 | 4 | 5 | 6 | 7 | C0 | C1 | C2 | C3 | C4 |
| C0 | 0 | 0 | 0 | 0 | 0 | 0 | 0 | 0 | 1  | 1  | 1  | 1  | 1  |
| C1 | 0 | 0 | 0 | 0 | 1 | 1 | 1 | 1 | 0  | 1  | 0  | 0  | 0  |
| C2 | 0 | 1 | 1 | 1 | 0 | 0 | 0 | 1 | 0  | 0  | 1  | 0  | 0  |
| C3 | 1 | 0 | 1 | 1 | 0 | 1 | 1 | 0 | 0  | 0  | 0  | 1  | 0  |
| C4 | 1 | 1 | 0 | 1 | 1 | 0 | 1 | 0 | 0  | 0  | 0  | 0  | 1  |

The five bit ECC code is obtained by applying the Hamming matrix of Table 1 to the eight bit result of a columnwise parity generator 12-102, 12-108 which generates column-wise parity of the eight data bytes. In other words the columnwise parity generator 12-102 calculates an eight bit character (0:7) that represents a parity bit for each column in the eight bit by eight byte matrix of each 64 bit word. This eight bit character is then reduced by the logical translator 12-103, 12-109 according to the Hamming matrix of Table 1. The effective Hamming matrix H for the ECC code (C0:C4) stored in the ECC code portion of 12-54 of the high speed buffer 12-08 along with the parity bits (P0:P7) stored in the parity portion 12-55 is shown by Table 2. The mod 2 matrix equation satisfied by this code is $Hx = a$, where "x" is the column vector:

[byte 0 parity bit, (P0); byte 0 data bits, (0:7);
byte 1 parity bit, (P1); byte 1 data bits, (0:7);
byte 2 parity bit, (P2); byte 2 data bits, (0:7);
byte 3 parity bit, (P3); byte 3 data bits, (0:7);
byte 4 parity bit, (P4); byte 4 data bits, (0:7);
byte 5 parity bit, (P5); byte 5 data bits, (0:7);
byte 6 parity bit, (P6); byte 6 parity bits, (0:7);
byte 7 parity bit, (P7); byte 7 data bits, (0:7);
ECC code parity bit, (C0); ECC code bits, (C1–C4)]

"a" is the column vector:

[1 1 1 1 1 1 1 1 1 1 1 1 1].

And "H" is the Hamming Matrix of Table 2.

TABLE 2

|    | Byte 0 |   |   |   |   |   |   |   |   | Byte 1 |   |   |   |   |   |   |   |
|----|----|---|---|---|---|---|---|---|---|----|---|---|---|---|---|---|---|
|    | P0 | 0 | 1 | 2 | 3 | 4 | 5 | 6 | 7 | P1 | 0 | 1 | 2 | 3 | 4 | 5 | 6 | 7 |
| C0 | 0 | 0 | 0 | 0 | 0 | 0 | 0 | 0 | 0 | 0 | 0 | 0 | 0 | 0 | 0 | 0 | 0 | 0 |
| C1 | 0 | 0 | 0 | 0 | 0 | 1 | 1 | 1 | 1 | 0 | 0 | 0 | 0 | 0 | 1 | 1 | 1 | 1 |
| C2 | 0 | 0 | 1 | 1 | 1 | 0 | 0 | 0 | 1 | 0 | 0 | 1 | 1 | 1 | 0 | 0 | 0 | 1 |
| C3 | 0 | 1 | 0 | 1 | 1 | 0 | 1 | 1 | 0 | 0 | 1 | 0 | 1 | 1 | 0 | 1 | 1 | 0 |
| C4 | 0 | 1 | 1 | 0 | 1 | 1 | 0 | 1 | 0 | 0 | 1 | 1 | 0 | 1 | 1 | 0 | 1 | 0 |
| P0 | 1 | 1 | 1 | 1 | 1 | 1 | 1 | 1 | 1 | 0 | 0 | 0 | 0 | 0 | 0 | 0 | 0 | 0 |
| P1 | 0 | 0 | 0 | 0 | 0 | 0 | 0 | 0 | 0 | 1 | 1 | 1 | 1 | 1 | 1 | 1 | 1 | 1 |
| P2 | 0 | 0 | 0 | 0 | 0 | 0 | 0 | 0 | 0 | 0 | 0 | 0 | 0 | 0 | 0 | 0 | 0 | 0 |
| P3 | 0 | 0 | 0 | 0 | 0 | 0 | 0 | 0 | 0 | 0 | 0 | 0 | 0 | 0 | 0 | 0 | 0 | 0 |
| P4 | 0 | 0 | 0 | 0 | 0 | 0 | 0 | 0 | 0 | 0 | 0 | 0 | 0 | 0 | 0 | 0 | 0 | 0 |
| P5 | 0 | 0 | 0 | 0 | 0 | 0 | 0 | 0 | 0 | 0 | 0 | 0 | 0 | 0 | 0 | 0 | 0 | 0 |
| P6 | 0 | 0 | 0 | 0 | 0 | 0 | 0 | 0 | 0 | 0 | 0 | 0 | 0 | 0 | 0 | 0 | 0 | 0 |
| P7 | 0 | 0 | 0 | 0 | 0 | 0 | 0 | 0 | 0 | 0 | 0 | 0 | 0 | 0 | 0 | 0 | 0 | 0 |

|    | Byte 2 |   |   |   |   |   |   |   |   | Byte 3 |   |   |   |   |   |   |   |
|----|----|---|---|---|---|---|---|---|---|----|---|---|---|---|---|---|---|
|    | P2 | 0 | 1 | 2 | 3 | 4 | 5 | 6 | 7 | P3 | 0 | 1 | 2 | 3 | 4 | 5 | 6 | 7 |
| C0 | 0 | 0 | 0 | 0 | 0 | 0 | 0 | 0 | 0 | 0 | 0 | 0 | 0 | 0 | 0 | 0 | 0 | 0 |
| C1 | 0 | 0 | 0 | 0 | 0 | 1 | 1 | 1 | 1 | 0 | 0 | 0 | 0 | 0 | 1 | 1 | 1 | 1 |
| C2 | 0 | 0 | 1 | 1 | 1 | 0 | 0 | 0 | 1 | 0 | 0 | 1 | 1 | 1 | 0 | 0 | 0 | 1 |
| C3 | 0 | 1 | 0 | 1 | 1 | 0 | 1 | 1 | 0 | 0 | 1 | 0 | 1 | 1 | 0 | 1 | 1 | 0 |
| C4 | 0 | 1 | 1 | 0 | 1 | 1 | 0 | 1 | 0 | 0 | 1 | 1 | 0 | 1 | 1 | 0 | 1 | 0 |
| P0 | 0 | 0 | 0 | 0 | 0 | 0 | 0 | 0 | 0 | 0 | 0 | 0 | 0 | 0 | 0 | 0 | 0 | 0 |
| P1 | 0 | 0 | 0 | 0 | 0 | 0 | 0 | 0 | 0 | 0 | 0 | 0 | 0 | 0 | 0 | 0 | 0 | 0 |
| P2 | 1 | 1 | 1 | 1 | 1 | 1 | 1 | 1 | 1 | 0 | 0 | 0 | 0 | 0 | 0 | 0 | 0 | 0 |
| P3 | 0 | 0 | 0 | 0 | 0 | 0 | 0 | 0 | 0 | 1 | 1 | 1 | 1 | 1 | 1 | 1 | 1 | 1 |
| P4 | 0 | 0 | 0 | 0 | 0 | 0 | 0 | 0 | 0 | 0 | 0 | 0 | 0 | 0 | 0 | 0 | 0 | 0 |
| P5 | 0 | 0 | 0 | 0 | 0 | 0 | 0 | 0 | 0 | 0 | 0 | 0 | 0 | 0 | 0 | 0 | 0 | 0 |
| P6 | 0 | 0 | 0 | 0 | 0 | 0 | 0 | 0 | 0 | 0 | 0 | 0 | 0 | 0 | 0 | 0 | 0 | 0 |
| P7 | 0 | 0 | 0 | 0 | 0 | 0 | 0 | 0 | 0 | 0 | 0 | 0 | 0 | 0 | 0 | 0 | 0 | 0 |

|    | Byte 4 |   |   |   |   |   |   |   |   | Byte 5 |   |   |   |   |   |   |   |
|----|----|---|---|---|---|---|---|---|---|----|---|---|---|---|---|---|---|
|    | P4 | 0 | 1 | 2 | 3 | 4 | 5 | 6 | 7 | P5 | 0 | 1 | 2 | 3 | 4 | 5 | 6 | 7 |
| C0 | 0 | 0 | 0 | 0 | 0 | 0 | 0 | 0 | 0 | 0 | 0 | 0 | 0 | 0 | 0 | 0 | 0 | 0 |
| C1 | 0 | 0 | 0 | 0 | 0 | 1 | 1 | 1 | 1 | 0 | 0 | 0 | 0 | 0 | 1 | 1 | 1 | 1 |
| C2 | 0 | 0 | 1 | 1 | 1 | 0 | 0 | 0 | 1 | 0 | 0 | 1 | 1 | 1 | 0 | 0 | 0 | 1 |
| C3 | 0 | 1 | 0 | 1 | 1 | 0 | 1 | 1 | 0 | 0 | 1 | 0 | 1 | 1 | 0 | 1 | 1 | 0 |
| C4 | 0 | 1 | 1 | 0 | 1 | 1 | 0 | 1 | 0 | 0 | 1 | 1 | 0 | 1 | 1 | 0 | 1 | 0 |
| P0 | 0 | 0 | 0 | 0 | 0 | 0 | 0 | 0 | 0 | 0 | 0 | 0 | 0 | 0 | 0 | 0 | 0 | 0 |
| P1 | 0 | 0 | 0 | 0 | 0 | 0 | 0 | 0 | 0 | 0 | 0 | 0 | 0 | 0 | 0 | 0 | 0 | 0 |
| P2 | 0 | 0 | 0 | 0 | 0 | 0 | 0 | 0 | 0 | 0 | 0 | 0 | 0 | 0 | 0 | 0 | 0 | 0 |
| P3 | 0 | 0 | 0 | 0 | 0 | 0 | 0 | 0 | 0 | 0 | 0 | 0 | 0 | 0 | 0 | 0 | 0 | 0 |
| P4 | 1 | 1 | 1 | 1 | 1 | 1 | 1 | 1 | 1 | 0 | 0 | 0 | 0 | 0 | 0 | 0 | 0 | 0 |
| P5 | 0 | 0 | 0 | 0 | 0 | 0 | 0 | 0 | 0 | 1 | 1 | 1 | 1 | 1 | 1 | 1 | 1 | 1 |
| P6 | 0 | 0 | 0 | 0 | 0 | 0 | 0 | 0 | 0 | 0 | 0 | 0 | 0 | 0 | 0 | 0 | 0 | 0 |
| P7 | 0 | 0 | 0 | 0 | 0 | 0 | 0 | 0 | 0 | 0 | 0 | 0 | 0 | 0 | 0 | 0 | 0 | 0 |

TABLE 2-continued

| | Byte 6 | | | | | | | | | Byte 7 | | | | | | | | |
|---|---|---|---|---|---|---|---|---|---|---|---|---|---|---|---|---|---|---|
| | P6 | 0 | 1 | 2 | 3 | 4 | 5 | 6 | 7 | P7 | 0 | 1 | 2 | 3 | 4 | 5 | 6 | 7 |
| C0 | 0 | 0 | 0 | 0 | 0 | 0 | 0 | 0 | 0 | 0 | 0 | 0 | 0 | 0 | 0 | 0 | 0 | 0 |
| C1 | 0 | 0 | 0 | 0 | 0 | 1 | 1 | 1 | 1 | 0 | 0 | 0 | 0 | 0 | 1 | 1 | 1 | 1 |
| C2 | 0 | 0 | 1 | 1 | 1 | 0 | 0 | 0 | 1 | 0 | 0 | 1 | 1 | 1 | 0 | 0 | 0 | 1 |
| C3 | 0 | 1 | 0 | 1 | 1 | 0 | 1 | 1 | 0 | 0 | 1 | 0 | 1 | 1 | 0 | 1 | 1 | 0 |
| C4 | 0 | 1 | 1 | 0 | 1 | 1 | 0 | 1 | 0 | 0 | 1 | 1 | 0 | 1 | 1 | 0 | 1 | 0 |
| P0 | 0 | 0 | 0 | 0 | 0 | 0 | 0 | 0 | 0 | 0 | 0 | 0 | 0 | 0 | 0 | 0 | 0 | 0 |
| P1 | 0 | 0 | 0 | 0 | 0 | 0 | 0 | 0 | 0 | 0 | 0 | 0 | 0 | 0 | 0 | 0 | 0 | 0 |
| P2 | 0 | 0 | 0 | 0 | 0 | 0 | 0 | 0 | 0 | 0 | 0 | 0 | 0 | 0 | 0 | 0 | 0 | 0 |
| P3 | 0 | 0 | 0 | 0 | 0 | 0 | 0 | 0 | 0 | 0 | 0 | 0 | 0 | 0 | 0 | 0 | 0 | 0 |
| P4 | 0 | 0 | 0 | 0 | 0 | 0 | 0 | 0 | 0 | 0 | 0 | 0 | 0 | 0 | 0 | 0 | 0 | 0 |
| P5 | 0 | 0 | 0 | 0 | 0 | 0 | 0 | 0 | 0 | 0 | 0 | 0 | 0 | 0 | 0 | 0 | 0 | 0 |
| P6 | 1 | 1 | 1 | 1 | 1 | 1 | 1 | 1 | 1 | 0 | 0 | 0 | 0 | 0 | 0 | 0 | 0 | 0 |
| P7 | 0 | 0 | 0 | 0 | 0 | 0 | 0 | 0 | 0 | 1 | 1 | 1 | 1 | 1 | 1 | 1 | 1 | 1 |

| | Check | | | | |
|---|---|---|---|---|---|
| | C0 | C1 | C2 | C3 | C4 |
| C0 | 1 | 1 | 1 | 1 | 1 |
| C1 | 0 | 1 | 0 | 0 | 0 |
| C2 | 0 | 0 | 1 | 0 | 0 |
| C3 | 0 | 0 | 0 | 1 | 0 |
| C4 | 0 | 0 | 0 | 0 | 1 |
| P0 | 0 | 0 | 0 | 0 | 0 |
| P1 | 0 | 0 | 0 | 0 | 0 |
| P2 | 0 | 0 | 0 | 0 | 0 |
| P3 | 0 | 0 | 0 | 0 | 0 |
| P4 | 0 | 0 | 0 | 0 | 0 |
| P5 | 0 | 0 | 0 | 0 | 0 |
| P6 | 0 | 0 | 0 | 0 | 0 |
| P7 | 0 | 0 | 0 | 0 | 0 |

This Hamming matrix results in an ECC Code whose low order bits are odd parity bits over subsets of the data bits; and ECC Code bit C0 is an odd parity bit over check bits C1 thru C4. Thus a data word of 64 zeros would have an all-ones check character, and all byte parity bits would equal 1.

Although the number of bits (13) necessary to accomplish the single bit correction and double bit detection function associated with the present invention is more than the minimum of eight which is required for a Hamming matrix for a 64 bit word, the amount of storage necessary to accomplish the requirement in the present invention is reduced by using the information already present in the data processing machine in the form of parity bits. By utilizing the parity bits associated with the data words, the present invention is able to use less storage space in the ECC code portion 12-54 of the buffer 12-08 for storing an ECC code, while retaining the capability of correcting all single bit errors in the data word and detecting all double bit errors, and also retaining the simple error checking capability of byte parity.

For a Hamming matrix necessary to resolve single-bit error correction and double-bit error detection, the number of bits of storage required for the ECC code can be determined by the following equation:

$$D + C < 2^{(C-1)}$$

where D equals the number of data bits in the word in which the function is to be resolved, and C is equal to the number of ECC code bits. Thus, the minimum number of ECC code bits required for resolution of single bit correction and double bit detection in a 64 bit word is eight. The present invention reduces the amount of storage necessary by three bits per 64 bit word. The amount of storage saved depends on the number of bits within the byte in a given data word. The amount of ECC code storage necessary for a given data word with X bytes of Y bits each can be resolved by the above Hamming code equation where D is replaced by Y, the number of bits per byte, so long as each byte has a parity bit associated with it.

The syndromes 12-59 and parity bits for identifying each single bit error in 64 bit words detected by the error checking and correcting code mechanism can be derived directly by referring to Table 2 at the bit at which the error occurs. The column at the bit containing an error will show the syndrome 12-59 and parity bits indicating that error. For instance, a single bit error at bit 6 of byte 7 will cause a syndrome 12-59 of 01011 and the P7 syndrome bit will be 1, i.e. there will be a parity error in byte 7. Double bit errors will have non-zero syndromes and fail to match any of the single bit error conditions. If no errors occur, the syndrome will be all zeros.

All the logic circuitry and the high speed buffers 12-09, 12-08 of the preferred embodiment are implemented with emitter coupled logic (ECL). The mainstore 12-03 is implemented with dynamic MOS technology. Note that other data processing circuitry and storage technologies may be used without detraction from the present invention.

Although not shown in the present invention, also associated with the high speed operand buffer 12-08 is an ECC code update mechanism. This ECC code update mechanism is necessary because in the data processing machine of the preferred embodiment, the data in the high speed buffer 12-08 may be altered, for instance by the operation of the execution unit 12-05 upon the data, before the data is moved out from the buffer 12-08 to the mainstore 12-03. Thus updating apparatus (not shown) is provided in the preferred embodiment of the present invention. The details of the apparatus for updating the ECC code associated with the high speed operand buffer 12-08 are not important to the present invention. The function is accomplished by recalculating the ECC code stored in the ECC code portion 12-54 of the buffer 12-08 whenever the data is purposely altered.

Further, in order to simplify the description, the latch points in the figures have been left out. However, latches occur in the circuitry at points necessary according to the timing of the particular machine. For example, typical latch points L occur as indicated in FIG. 2.

While the invention has been particularly shown and described with reference to the preferred embodiments thereof it will be understood by those skilled in the art that various changes in form and in detail may be made therein and without departing from the spirit and the scope of the invention.

What is claimed is:

1. In a data processing machine an apparatus for storing data, comprising:
    storage means for storing data words consisting of a plurality of bytes of data and a plurality of parity bits, one for each of said bytes, respectively; and
    error checking and correcting means for detecting and correcting errors when said data words are moved out of said storage means including means for generating a move-in error checking and correcting code including a first portion and a second portion identifiable by said plurality of parity bits when data words are moved into said storage means, means for storing said first portion of said move-in error checking and correcting code in said storage means, means for generating a move-out error checking and correcting code when said data word is moved out of said storage means and means for comparing said move-out error checking and correcting code against said move-in error checking and correcting code, further including
    means for identifying said second portion of said move-in error checking and correcting code from said plurality of parity bits.

2. The apparatus of claim 1, wherein:
    said error checking and correcting means corrects all single bit errors in said data word and detects all double bit errors in said data word.

3. The apparatus of claim 2, wherein:
    said data words consists of 64 bits which include 8 bytes of 8 bits each; and
    said first portion of said move-in error checking and correcting code requires 5 bits of storage.

4. The apparatus of claim 1, wherein said error checking and correcting means includes:
    a columnwise parity generator means for generating a plurality of column parity bits for each column, respectively, in a matrix of a plurality of rows each row consisting of one byte from said plurality of bytes in a given word; and
    a Hamming matrix means for generating said first portion of said move-in error checking and correcting code from said plurality of column parity bits.

5. The apparatus of claim 4, wherein:
    said error checking and correcting means corrects all single bit errors in said data word and detects all double bit errors in said data word.

6. The apparatus of claim 5, wherein
    said second portion of said move-in error checking and correcting code equals said plurality of parity bits.

7. The apparatus of claim 4, wherein
    said second portion of said move-in error checking and correcting code equals said plurality of parity bits.

8. The apparatus of claim 1, wherein
    said second portion of said move-in error checking and correcting code equals said plurality of parity bits.

9. An apparatus for detecting and correcting errors in data words that are moved into and out of a memory, the data words including a plurality of bytes of data, comprising:
    means for generating byte parity for each byte in said data words when they are moved into the memory;
    means for storing said byte parity;
    means for generating for the respective words a first portion of a move-in error checking and correcting code including said first portion and a second portion identifiable by said byte parity when the words are moved into the memory;
    means for storing said first portion of the move-in error checking and correcting code;
    means for generating a move-out error checking and correcting code when said words are moved out of the memory;
    means for checking said move-out error checking and correcting code against said first portion of said move-in error checking and correcting code and said byte parity to detect errors; and
    means responsive to detected errors for correcting correctable errors.

10. The apparatus of claim 9, wherein said means for generating said first portion of the move-in error checking and correcting code includes:
    means for generating column parity for said respective words including a parity bit for each column in a matrix of a plurality of rows, each row consisting of one byte from the respective word; and
    translation means for translating said column parity into said first portion of the move-in error checking and correcting code.

11. The apparatus of claim 10, wherein said means for generating a move-out error checking and correcting code includes:
    means for generating byte parity for said data words when they are moved out of the memory;
    means for checking byte parity generated when the data words are moved out against the stored byte parity and generating a parity check result;
    means for generating a first portion of the move-out error checking and correcting code;
    means for generating a syndrome in response to a comparison of the first portion of the move-in error checking and correcting code against the first portion of the move-out error checking and correcting code; and
    means, responsive to the parity check result and the syndrome, for detecting errors.

12. The apparatus of claim 11, wherein said means for correcting correctable errors includes:
    means for receiving the parity check result, the syndrome and the byte parity, and responsive to the parity check result, the syndrome and the byte parity, for correcting errors.

13. The apparatus of claim 9, wherein
    said second portion of said move-in error checking and correcting code equals said byte parity.

* * * * *